H. T. HUGHES.
NUT LOCK.
APPLICATION FILED NOV. 10, 1913.

1,114,696.

Patented Oct. 20, 1914.

Witnesses
M. S. Watson
Henry P. Bright

Inventor
H. T. Hughes
By Chandlee & Chandlee
Attorneys

UNITED STATES PATENT OFFICE.

HUGH T. HUGHES, OF YOUNGSTOWN, OHIO, ASSIGNOR OF ONE-HALF TO JOSEPH POREMBSKI, AND ONE-THIRD TO SHELLEY M. STRAIN, BOTH OF YOUNGSTOWN, OHIO.

NUT-LOCK.

1,114,696.      Specification of Letters Patent.      Patented Oct. 20, 1914.

Application filed November 10, 1913. Serial No. 800,148.

*To all whom it may concern:*

Be it known that I, HUGH T. HUGHES, a citizen of the United States, residing at Youngstown, in the county of Mahoning, State of Ohio, have invented certain new and useful Improvements in Nut-Locks; and I do hereby declare the following to be a full, clear, and exact description of the invention, such as will enable others skilled in the art to which it appertains to make and use the same.

This invention relates to nut locks.

The object of the invention resides in the provision of an improved structure for preventing nuts from becoming disengaged from bolts as a result of jars or vibrations and is particularly adapted for use in connection with rail joints.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1:
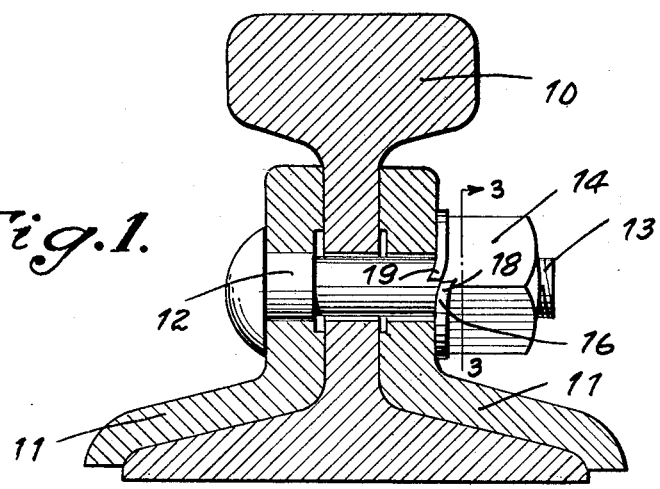
Figure 2:
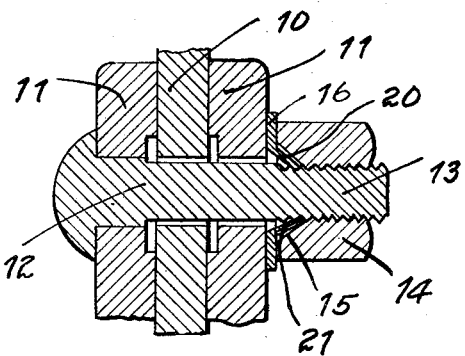
Figure 3:
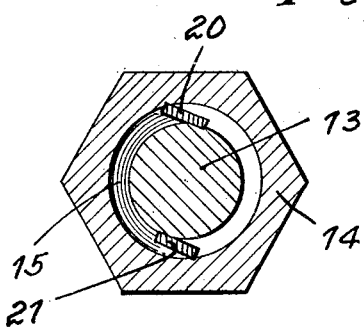
Figure 4:
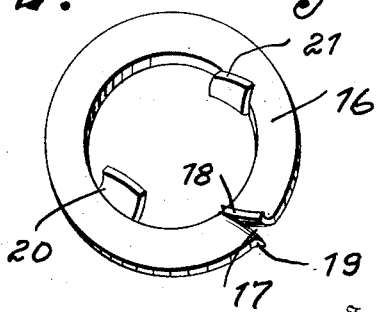

Figure 1 is a vertical section through a rail joint having the improved nut lock associated therewith; Fig. 2, a longitudinal section through the bolt, nut and locking washer and also disclosing the fish plates and web of the rail joints; Fig. 3, a section on the line 3—3 of Fig. 1, and Fig. 4, a perspective view of the lock washer.

Referring to the drawings 10 indicates the rail and 11 the fish plates all of which is embodied in a rail joint in the usual and well known manner. Engaged through the fish plates 11 and web of the rail 10 is a bolt 12 having the usual threaded portion 13. Engaged on the threaded portion 13 is a nut 14 the inner end of whose bore is smooth and flared outwardly as at 15. Interposed between the nut 14 and the adjacent fish plate 11 is a lock washer 16. This washer 16 is slit as at 17 and the resulting terminals of the washer are directed laterally in opposite directions as at 18 and 19. Formed integral with the washer 16 at diametrically opposite points in the inner edge thereof are laterally extending tongues 20 and 21. These tongues 20 and 21 are inclined outwardly with respect to the direction of rotation of the nut 14 when same is screwed upon the bolt 12 so that the outermost edge of the tongue will engage the wall of the tapered portion 15 and sharply bite into said wall.

In the use of the improved lock the bolt 12 is inserted through the fish plates and rail and the washer 16 then applied in encircling relation to the bolt. The nut 14 is then screwed upon the threaded portion 13 of the bolt. During the screwing of the nut 14 on the bolt the tapered portion 15 will coöperate with the tongues 20 and 21 and force same into contact with the thread 13. When the nut 14 is screwed home as far as possible the laterally directed portion 18 will bite into the inner end of the nut and the laterally directed portion 19 into the adjacent fish plate 11 thus holding the washer 16 against rotation in a direction that would effect the unscrewing of the nut 14. It will also be obvious that when the nut 14 is screwed home the binding action between the tongues, tapered wall 15, and threaded bolt portion 13 together with the biting of the outer edges of said tongues into the tapered wall 15 will serve to hold the nut 14 against unscrewing rotation in an efficient manner.

What is claimed is:—

In a nut lock, a bolt having a threaded portion, a nut engaged on said threaded portion and having the inner end of its bore flared and smooth, a washer encircling the bolt inwardly of the nut, said washer being split and having its resulting terminals bent laterally in opposite directions, and lateral tongues on the washer inclined outwardly with respect to the direction of rotation of the nut whereby the outermost edges of said tongues will engage the flared wall of the bore of the nut when the latter is screwed home, and said tongues also being forced into engagement with the shank of the bolt by the flared wall of the bore of the nut when the latter is applied.

In testimony whereof, I affix my signature, in the presence of two witnesses.

HUGH T. HUGHES.

Witnesses:
V. F. MALECKI,
JOHN HULKIEWICK.

Copies of this patent may be obtained for five cents each, by addressing the "Commissioner of Patents, Washington, D. C."